Figure 1:
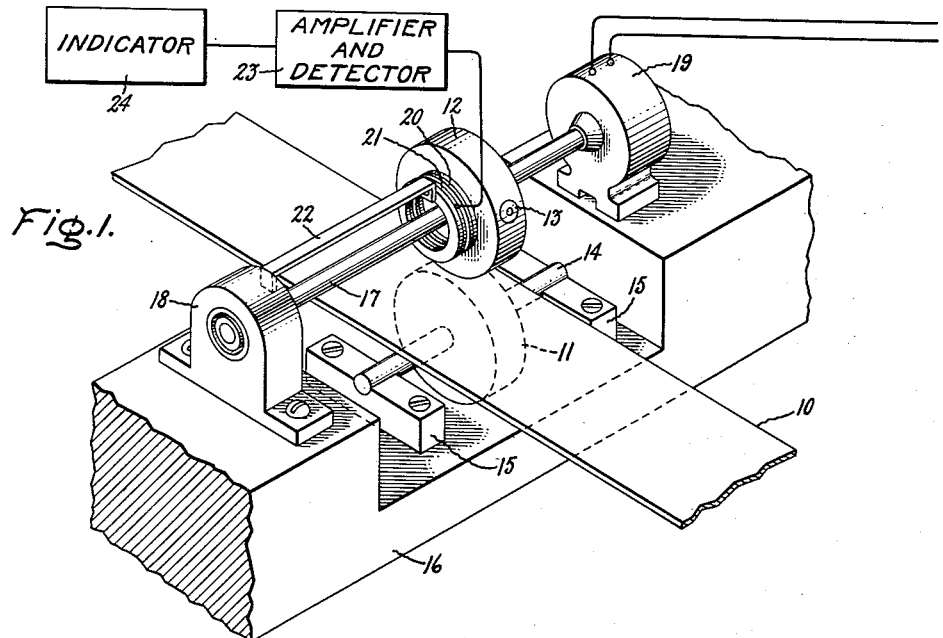

May 13, 1958  E. S. SAMPSON  2,834,203
APPARATUS FOR MEASURING HARDNESS
Filed June 27, 1955

Inventor:
Ernest S. Sampson,
by Newton D. Moise
His Attorney.

United States Patent Office 2,834,203
Patented May 13, 1958

2,834,203
APPARATUS FOR MEASURING HARDNESS

Ernest S. Sampson, Schenectady, N. Y., assignor to General Electric Company, a corporation of New York Application June 27, 1955, Serial No. 518,283

11 Claims. (Cl. 73—81)

This invention relates to apparatus for measuring the hardness of a material and, more particularly, to apparatus that may be adapted to measure hardness of a rapidly moving strip material.

In the production of various materials, such, for example, as strips of steel, it is desirable to measure the hardness of the material at one or more points in the manufacturing process in order to control the product to fit the eventual user's specifications. Devices heretofore provided for making such a measurement have not been well adapted for production line installation and have been more suitable for laboratory use. Accordingly, a primary object of the present invention is to provide such apparatus that is suitable for use in heavy industrial applications, such as in the production of steel strips, where the apparatus measures the hardness of a strip as it rapidly emerges from a processing machine.

Another object of the invention is to provide such apparatus that produces indications of the hardness of a moving strip or sheet of material at regularly spaced points along the length of material.

Another object is to provide apparatus for measuring the hardness of a moving strip or sheet of material in which the speed of movement of the material does not affect the measurement.

Another object of the invention is to provide such apparatus which is relatively insensitive to temperature variations and shock.

It is known that the hardness of a material may be determined by making an indentation in the surface of the material and measuring the depth of the indentation and the force exerted to make the indentation. The ratio of force exerted to depth of indentation is an indication of the hardness of the material under test. Apparatus based on that principle may be somewhat complex because measurements of both the force and the indentation are required and furthermore, means must be provided for obtaining the ratio of the two quantities. Therefore, it is a further object of the present invention to provide apparatus in which an indentation of constant or predetermined depth is made in the material being tested, and it is only necessary to measure the force applied to make that indentation in order to obtain an indication of the hardness of the material.

One embodiment of the invention may comprise a support member and indenting means carried by the support member for making an indentation of predetermined depth in the material whose hardness is to be determined. Piezoelectric means are associated with the indenting means for providing an electrical signal whose amplitude is related to the force exerted to make the indentation. The amplitude of the electrical signal is measured to provide an indication of the hardness of the material in which the indentation is made.

The novel features which are believed to be characteristic of the invention are set forth with particularity in the appended claims. The invention itself, however, both as to its organization and method of operation, together with further objects and advantages thereof, may best be understood by reference to the following description taken in conjunction with the accompanying drawing, in which Fig. 1 is a perspective view of a typical installation embodying the apparatus of the invention; and Fig. 2 is an enlarged sectional view on the radius of the wheel 12 of Fig. 1 extending through the center of the indenting means 13.

Figure 2:
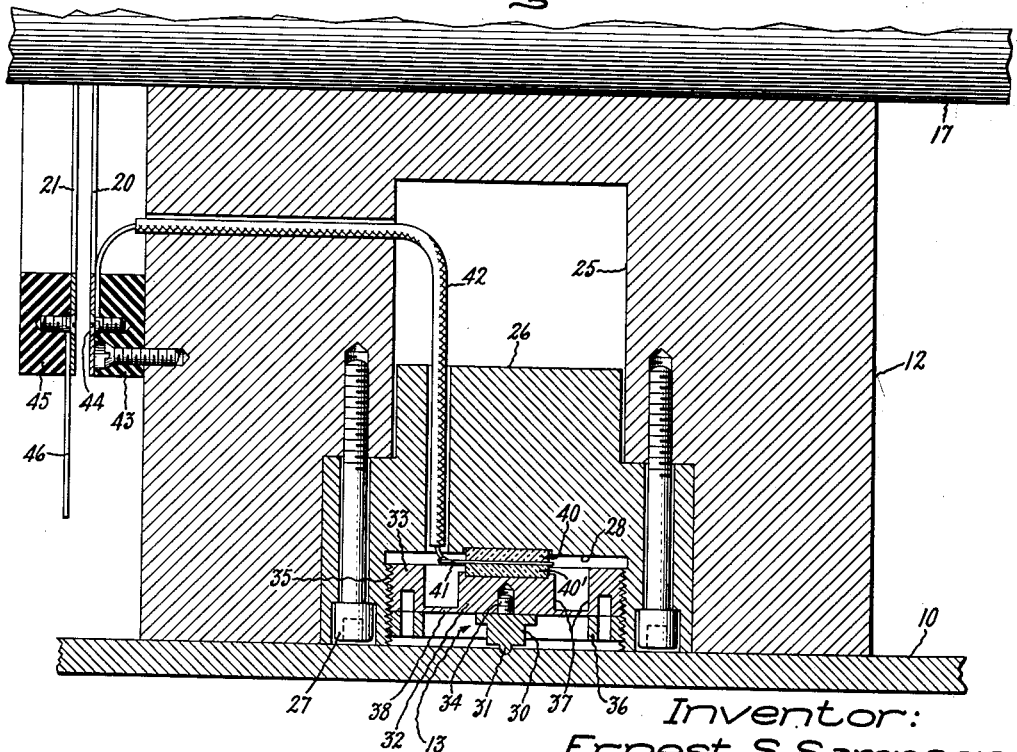

Fig. 1 illustrates a typical installation embodying the apparatus of the invention for measuring the hardness of a strip material such as a steel strip 10. The strip 10 is illustrated as passing between a supporting wheel 11 and an indenting wheel 12 which carries indenting means 13.

The supporting wheel 11 is carried on an axle 14, which may be mounted for rotation on bearing surfaces formed on blocks 15 that are mounted on the supporting structure 16 of the installation. Alternatively, the axle 14 may be fixedly supported and the wheel 11 suitably mounted for rotation on the axle. The primary purpose of the supporting wheel 11 is to provide a solid mass below the strip 10 being tested against which force may be applied by the indenting means 13 carried on the wheel 12.

The wheel 12 is fixed on an axle 17, one end of which is supported for rotation in suitable bearings in a mount 18 secured to the structure 16. The other end of the axle 17 is mechanically connected to the rotor of a motor 19 that may be energized from a conventional alternating current supply (not shown). The purpose of the motor 19 is merely to reduce the friction that would otherwise occur on the peripheral surface of the measuring wheel 12 as the rapidly moving steel strip passes between the wheels 11 and 12 and causes them to rotate. It is obvious that the motor 19 may be eliminated if wear on the wheel 12 is of no concern.

As will be explained later in detail, the indenting means 13 carried by the wheel 12 has associated therewith means for producing electrical signals, in this case, pulses, whose amplitudes are related to the forces required to produce indentations of constant predetermined depth in the steel strip 10 as the measuring wheel 12 rotates in contact with the steel strip. The electrical pulses are supplied internally through the wheel 12 to an electrically conductive ring 20 mounted on the side of the wheel for rotation therewith. Adjacent to but not contacting the ring 20 is a similar conductive ring 21 which is fixedly supported by means of a bracket 22 attached to the mount 18. The two conductive rings 20 and 21, separated by a small air gap, comprise an air dielectric type of capacitor, whereby the electrical pulses supplied to the conductive ring 20 are capacitively coupled to the ring 21. Of course, other coupling means, such as conventional slip rings, may be provided, if desired.

The electrical pulses present on the ring 21 may be supplied to a conventional amplifier and peak detector shown as a single unit 23. The output of the peak detector may be supplied to a conventional indicating means 24, such as a direct current voltmeter, to provide an indication of the hardness of the material being tested. Alternatively, the electrical pulses present on the fixed ring 21 may be supplied to a conventional cathode ray oscilloscope, and the amplitudes of the pulses measured by means of a scale fixed to the face of the cathode ray tube.

It is pointed out that the amplifier or other device to which the pulses are supplied from the ring 21 preferably has a high input impedance. It is readily apparent to those skilled in the art that if the device has a low input impedance, the amplitudes of the pulses coupled thereto may be materially reduced because of the voltage divider effect of the device and the air dielectric capacitor (rings 20 and 21). It has been found that a conventional cathode follower amplifier, which inherently has high input impedance, serves satisfactorily as a device to which the pulses may be supplied and, if desired, further stages of amplification may be provided after the cathode follower.

The peak detector to which the output of the amplifier is supplied may be entirely conventional and serves to provide a unidirectional potential that is proportional to the peak values of the amplified pulses. The indicator for measuring that potential may be calibrated in terms of hardness of the material under test, or calibration curves may be used to convert from indicator reading to hardness. It is pointed out that the calibration of the indicator is related to the amplification of the pulses, and it may be desirable to set that amplification at a desired level by using as a standard a test piece of material whose hardness is known.

The wheel 12 and its mounting means functions to support the indenting means 13 and the associated force sensitive means and to provide force for making an indentation in the steel strip 10 under test. It is seen from Fig. 2, which shows in detail an embodiment of the indenting means and force sensitive means, that the peripheral surface of the wheel 12 contacts the surface of the steel strip 10, and that the wheel is provided with a bore 25 extending inwardly from its peripheral surface into which the indenting means and the force sensitive means associated therewith are inserted. The indenting and force measuring means are mounted in a plug 26 which fits into the bore 25 and is secured therein by suitable means such as bolts 27. The bolts 27 are countersunk below the outer surface of the plug so that their heads do not come into contact with the surface of the steel strip 10. The plug 26 does not extend outwardly beyond the peripheral surface of the wheel 12.

The indenting means 13 and force sensitive means 40, 40' are retained within a threaded bore 28 in the plug 26. In this embodiment of the invention, the indenting means comprises an indenter 30 having a small, ball-shaped protuberance 31 formed thereon. The indenter 30 is secured to the center portion 32 of a disk 33 by means of a stud 34, and the edge of the disk 33 is threaded at 35 so that the disk may be screwed into the bore 28. If desired, a lock washer 36 may be screwed into the bore 28 to hold the disk 32 securely in place. The disk 33 has a deep groove 37 formed therein to provide a thin web 38 joining its center portion 32 to its outer portion on which the threads are formed. Thus the disk 33 acts as a flexible diaphragm to provide minimum resistance to the transmission of force through its center portion even though the disk is secured in the bore 28.

The force sensitive means comprise a pair of disk-shaped piezoelectric elements 40 and 40' interposed between the end wall of the bore 28 and the center portion 32 of the disk 33. The piezoelectric elements may consist of a well known material such as quartz, barium titanate, lead metaniobate, or the like, and are so polarized that when force is applied between their major surfaces, the juncture of the elements becomes positive relative to the outer surfaces of the elements. The outer surfaces of the elements may be silvered in the customary manner to provide good electrical contact with the plug 26 and the center portion 32 of the disk 33 between which they are retained. In order to provide a convenient means for obtaining the potential developed on the inner surfaces of the elements, an electrically conductive plate 41 may be placed therebetween, and those surfaces may be silvered in the usual manner to provide good electrical contact with the plate. This plate 41 is connected by conductor 42 to ring 20 which is capacitively coupled to ring 21 for the purposes previously described.

The sizes of the various portions of the indenting and force sensitive means are such that when the peripheral surface of the wheel 12 is in contact with the surface of the steel strip 10, only the lower portion of the protuberance 31 is forced into the surface of the steel strip. The force which causes the indenter 31 to make an indentation in the surface of the steel strip 10 is transmitted thereto through the center portion 32 of the disk 33 and the piezoelectric elements 40 and 40' from the remainder of the wheel 12 and its mounting means. Thus the potential developed by the piezoelectric elements 40 and 40' is an indication of the amount of force required to produce an indentation in the surface of the steel strip 10 of the predetermined depth.

It is to be understood that differences in size between various parts of the apparatus have been exaggerated in the drawing in order to show the operation of the apparatus more clearly. For example, in practice, the depth of the indentation made in the steel strip under test may be of the order of .001 inch, and the ball-shaped protuberance 31 on the indenter may be of the order of .050 inch in diameter. A force of the order of only several hundred pounds is required to make such an indentation in the surface of cold rolled steel. It is also pointed out that the indentation used not be made by a ball-shaped element but may be made by an element of any desired shape that will make an indentation without requiring the use of undue force. Of course, the force exerted to make the indentation must be sufficient to provide a useable output potential from the piezoelectric force sensitive means through which the force is transmitted to the indenting means.

One end of a shielded lead 42 is connected to the conductive plate 41 interposed between the piezoelectric elements 40 and 40'. The lead extends through suitable passages in the wheel 12 and the plug 26 and has its other end connected to the conductive ring 20 previously mentioned with reference to Fig. 1. The conductive ring 20 is mounted on an insulating material 43 which may be secured to the side of the wheel 12 by screws or other convenient means. The shielded lead 42 may be connected to the ring 20 by means of a screw 44 which also serves to secure the ring to the insulating member 43. Of course, the shield of the lead 42 is grounded to the wheel 12. The use of a shielded lead provides mechanical strength to prevent movement of the lead and maintain substantially constant the capacitance between the lead and ground.

The conductive ring 21, which cooperates with the ring 20 to form a capacitor, is illustrated as mounted on an insulating material 45 from which connection 46 leads to the amplifier and detector previously mentioned.

The apparatus is illustrated as including only a single indenting means carried by the supporting wheel 12. However, the invention contemplates the provision of as many indenting means distributed about the periphery of the wheel 12 as are desirable for any particular application. If a sufficient number of indenting means are provided, the indication of hardness may be virtually continuous. Furthermore, the indenting wheel 12 may be of any desired diameter so that the hardness measurements may be made at points spaced apart along the length of the strip by any desired amount.

If the thickness of the material 10 being tested is varied by any significant amount, the apparatus may be easily adapted for the changed thickness by merely replacing the blocks 15 on which the supporting wheel 11 is mounted with blocks having the proper thickness. Alternatively, the supporting wheel 11 may be replaced by one having a different diameter. Thus the installation may be varied to be applicable to measuring the hardness of materials of various thicknesses.

It is now apparent that the invention attains the objectives set forth. Apparatus embodying the invention is rugged in construction and well adapted for use in conjunction with heavy industrial processes. Hardness measurements may be made at regularly spaced points along a length of material with the spacing determined by the construction of the apparatus. The use of piezoelectric force sensitive means provides apparatus that is relatively insensitive to mechanical shock or temperature variations. The electronic apparatus embodied in the invention is conventional and reduced to a minimum.

Although one embodiment of the invention has been illustrated, the invention is not limited thereto since many modifications may be made by one skilled in the art and is intended by the appended claims to cover all such modifications as fall within the true spirit and scope of the invention.

What I claim as new and desire to secure by Letters Patent of the United States is:

1. Apparatus for determining the hardness of a continuously moving strip of material comprising movable supporting means, indenting means carried by said supporting means for making an indentation of predetermined depth in the material, means coupled to said supporting means for imparting cyclical movement whereby said indenting means periodically makes an indentation in the moving material along its length, piezoelectric means carried by said supporting means and positioned to receive forces applied to said indenting means for providing an electrical potential related in amplitude to the force exerted to make said indentation, and means for measuring said electrical potential.

2. Apparatus for determining the hardness of a moving strip of material comprising movable supporting means, indenting means carried by said supporting means for making an indentation of predetermined depth in material, means coupled to said supporting means for imparting cyclical movement whereby said indenting means periodically makes an indentation in the moving material along its length, piezoelectric means interposed between said supporting means and said indenting means for providing an electrical potential related in amplitude to the force exerted to make said indentation, and means for measuring said electrical potential.

3. Apparatus for determining the hardness of a material comprising a wheel adapted to rotate with its peripheral surface in contact with said material, indenting means carried by said wheel and extending outwardly past said peripheral surface for making an indentation of predetermined depth in said material, piezoelectric means carried by said supporting means and positioned to receive forces applied to said indenting means for providing an electrical potential related in amplitude to the force exerted to make said indentation, and means for measuring the amplitude of said electrical signal.

4. Apparatus for determining hardness of a material comprising a wheel adapted to rotate with its peripheral surface in contact with said material and having a bore extending inwardly from said peripheral surface, indenting means located within said bore and extending outwardly past said peripheral surface for making an indentation of predetermined depth in said material, piezoelectric means in said bore interposed between said indenting means and the end of said bore for providing an electrical potential related in amplitude to the force exerted to make said indentation, and means for measuring said electrical potential.

5. Apparatus for determining hardness of a material comprising a wheel adapted to rotate with its peripheral surface in contact with said material and having a bore extending inwardly from said peripheral surface, indenting means located within said bore and extending outwardly past said peripheral surface for making an indentation of predetermined depth in said material, piezoelectric means in said bore interposed between said indenting means and the end of said bore for providing an electrical potential related in amplitude to the force exerted to make said indentation, and means for supplying said electrical potential from the rotating piezoelectric means to potential measuring means.

6. Apparatus for determining hardness of a material comprising rotatable supporting means, indenting means carried by said rotatable supporting means for making indentations of predetermined depth in said material as said supporting means rotates, force sensitive means carried by said rotatable supporting means and positioned to receive forces applied to said indenting means for providing electrical pulses related in amplitude to the forces exerted to make said indentations, means for measuring electrical pulse amplitudes, and means for capacitively coupling said pulses from said force sensitive means to said measuring means.

7. Apparatus for determining the hardness of a material comprising a wheel adapted to rotate with its peripheral surface in contact with said material, indenting means carried by said wheel and extending outwardly past said peripheral surface for making indentations of predetermined depth in said material, force sensitive means carried by said rotatable supporting means and positioned to receive forces applied to said indenting means for providing electrical pulses related in amplitude to the forces exerted to make said indentations, a first conductive member mounted on said wheel for rotation therewith and electrically connected to said force sensitive means, a second conductive member fixedly mounted and spaced from said first conductive member whereby said electrical pulses are capacitively coupled from said first conductive member to said second conductive member, and measuring means electrically connected to said second conductive member for measuring the amplitudes of said pulses.

8. Apparatus for determining hardness of a material comprising a wheel adapted to rotate with its peripheral surface in contact with said material and having a bore extending inwardly from said peripheral surface, indenting means located within said bore and extending outwardly past said peripheral surface for making indentations of predetermined depth in said material, piezoelectric means in said bore interposed between said indenting means and the end of said bore for providing electrical pulses related in amplitude to the forces exerted to make said indentations, a first conductive member mounted on said wheel for rotation therewith and electrically connected to said force sensitive means, a second conductive member fixedly mounted and spaced from said first conductive member whereby said electrical pulses are capacitively coupled from said first conductive member to said second conductive member, and measuring means electrically connected to said second conductive member for measuring the amplitudes of said pulses.

9. In apparatus for determining the hardness of a material, the combination of a wheel adapted to rotate with its peripheral surface in contact with said material, indenting means carried by said wheel and extending outwardly past said peripheral surface for making an indentation of predetermined depth in said material, and piezoelectric means carried by said supporting means and positioned to receive forces applied to said indenting means for providing an electrical potential related in amplitude to the force exerted to make said indentation.

10. In apparatus for determining the hardness of a material, the combination of a wheel adapted to rotate with its peripheral surface in contact with said material and having a bore extending inwardly from said peripheral surface, indenting means located within said bore and extending outwardly past said peripheral surface for making an indentation of predetermined depth in said material, and piezoelectric means in said bore interposed between said indenting means and the end of said bore for providing an electrical potential related in amplitude to the force exerted to make said indentation.

11. In apparatus for determining hardness of a material, the combination of rotatable supporting means, indenting means carried by and extending outwardly from said rotatable supporting means for making indentations of predetermined depth in said material as said supporting means rotates, and force sensitive means carried by said rotatable supporting means and positioned to receive forces applied to said indenting means for providing electrical pulses related in amplitude to the forces exerted to make said indentations.

References Cited in the file of this patent

UNITED STATES PATENTS

| | | |
|---|---|---|
| 1,192,670 | Moore et al. | July 25, 1916 |
| 2,038,487 | Gogan | Apr. 21, 1936 |
| 2,441,283 | O'Hara | May 11, 1948 |
| 2,677,271 | Faris et al. | May 4, 1954 |

FOREIGN PATENTS

| | | |
|---|---|---|
| 708,493 | Great Britain | May 5, 1954 |